(12) United States Patent
Kienle et al.

(10) Patent No.: US 11,897,511 B2
(45) Date of Patent: Feb. 13, 2024

(54) MULTI-HYPOTHESIS OBJECT TRACKING FOR AUTOMATED DRIVING SYSTEMS

(71) Applicant: Robert Bosch GmbH, Stuttgart (DE)

(72) Inventors: Theresa Veronika Kienle, Stuttgart (DE); Thomas Benjamin Gussner, Ludwigsburg (DE); Oliver F. Schwindt, Sunnyvale, CA (US); Stephan Reuter, Elchingen (DE); Andreas Heyl, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 56 days.

(21) Appl. No.: 16/888,227

(22) Filed: May 29, 2020

(65) Prior Publication Data

US 2020/0377124 A1 Dec. 3, 2020

Related U.S. Application Data

(60) Provisional application No. 62/854,821, filed on May 30, 2019.

(51) Int. Cl.
*B60W 60/00* (2020.01)
(52) U.S. Cl.
CPC .... *B60W 60/0025* (2020.02); *B60W 60/0027* (2020.02); *B60W 2552/50* (2020.02); *B60W 2552/53* (2020.02); *B60W 2554/4029* (2020.02)
(58) Field of Classification Search
CPC ......... B60W 60/0025; B60W 60/0027; B60W 2552/50; B60W 2552/53; B60W 2554/4029; B60W 2554/00; B60W 60/001; B60W 30/08; B60W 30/09; B60W 2554/4026; B60W 2554/4023; B60W 2554/20; G01S 7/4808; G01S 17/931; G01S 2013/9323; G01S 2013/9324; G01S 13/867; G01S 13/862; G01S 15/931; G01S 13/87; G01S 13/865; G01S 13/723;
(Continued)

(56) References Cited

U.S. PATENT DOCUMENTS 5,996,941 A * 12/1999 Surauer ................. B64G 1/365
244/165
7,639,841 B2 12/2009 Zhu et al.
(Continued)

FOREIGN PATENT DOCUMENTS

| EP | 3486687 A1 * | 5/2019 | ............. G01S 19/24 |
| WO | WO-2019042786 A1 * | 3/2019 | ........... G01S 13/931 |
| WO | WO-2020126142 A1 * | 6/2020 | ........... G01S 13/931 |

*Primary Examiner* — Russell Frejd
*Assistant Examiner* — Ellis B. Ramirez
(74) *Attorney, Agent, or Firm* — Michael Best & Friedrich LLP

(57) ABSTRACT

Methods and systems for multi-hypothesis object tracking for automated driving systems. One system includes an electronic processor configured to receive environment information and generate pseudo-measurement data associated with an object within an environment of the vehicle. The electronic processor is also configured to determine, based on the environment information and the pseudo-measurement data, a set of association hypotheses regarding the object. The electronic processor is also configured to determine, based on the set of association hypotheses, an object state of the object. The electronic processor is also configured to control the vehicle based on the determined object state.

17 Claims, 7 Drawing Sheets

(58) Field of Classification Search
CPC ......... G01S 13/931; G01S 2013/93272; G01S 2013/93274; G01S 17/66; G01S 13/66; G08G 1/166; G08G 1/165
USPC .............................................. 701/26, 41, 42
See application file for complete search history.

(56) References Cited

U.S. PATENT DOCUMENTS

| | | |
|---|---|---|
| 8,098,889 B2 | 1/2012 | Zhu et al. |
| 9,476,730 B2 | 10/2016 | Samarasekera et al. |
| 10,011,276 B2 | 7/2018 | Obata et al. |
| 2005/0021201 A1* | 1/2005 | Klotz .................. G01S 13/86 702/189 |
| 2006/0058954 A1* | 3/2006 | Haney .................. G01S 5/20 701/533 |
| 2009/0103779 A1 | 4/2009 | Loehlein et al. |
| 2009/0312985 A1* | 12/2009 | Eliazar .................. G06N 20/00 702/187 |
| 2011/0129119 A1* | 6/2011 | Eggert .................. G06T 7/20 382/103 |
| 2011/0313650 A1* | 12/2011 | Tome .................... G01C 21/16 702/145 |
| 2018/0067490 A1* | 3/2018 | Pollach ................ G05D 1/0255 |
| 2018/0314921 A1* | 11/2018 | Mercep ................. G01S 7/539 |
| 2019/0004166 A1* | 1/2019 | Orlowski ............... G01S 17/58 |
| 2019/0049580 A1 | 2/2019 | Natroshvili et al. |
| 2020/0142026 A1* | 5/2020 | Bush .................... G01S 13/931 |
| 2020/0218913 A1* | 7/2020 | Unnikrishnan ...... G06K 9/6218 |
| 2021/0233261 A1* | 7/2021 | Aeberhard ............ G06T 7/292 |
| 2021/0237769 A1* | 8/2021 | Ostafew .......... B60W 30/18163 |
| 2021/0254982 A1* | 8/2021 | Wang ................... G01S 13/726 |

\* cited by examiner

MULTI-HYPOTHESIS OBJECT TRACKING FOR AUTOMATED DRIVING SYSTEMS

RELATED APPLICATIONS

This application claims the benefit of U.S. Provisional Application No. 62/854,821, filed May 30, 2019, the entire contents of all of which are hereby incorporated by reference.

FIELD

Embodiments relate to multi-hypothesis object tracking for automated driving systems, and, more particularly, to robustness against errors in object tracking with multi-hypothesis approaches.

SUMMARY

Driver assistance and automated driving (referred to herein collectively as "automated driving") detect one or more objects, such as another vehicle, a pedestrian, a lane marking, a curb, or the like, within an area or environment surrounding the vehicle using a variety of sensors with numerous overlapping fields of view. Using the sensor information, an automated driving system may determine one or more parameters associated with a detected object, such as a position, a direction of movement, or the like (a determined object state). The automated driving system then controls the vehicle based on the determined object state. Accurately determining the object state enables the vehicle to be properly controlled (for example, steered to avoid a collision with the object).

However, errors are often produced in object tracking through, among other things, erroneous measurement models, errors in sensor data preprocessing, or a combination thereof. Erroneous classification of a detected object may lead to the utilization of an erroneous measurement model. As one example, when an object is erroneously classified as a cyclist when the object is actually a vehicle, a measurement model specific to a cyclist may be used to track the object. However, because the object is not actually a cyclist, the utilization of the cyclist measurement model may lead to inappropriate control of the vehicle. As another example, during preprocessing of sensor data, the clustering of lidar stixels to form an "L" shape may incorrectly detect one object when, in reality, two objects exist. Such errors may lead to an incorrect object state, a track rupture, or a combination thereof. As a result, the vehicle may be controlled in an inappropriate manner due to the incorrect object state.

Accordingly, there is a need to improve the robustness against incorrect assumptions in measurement models, data preprocessing, or a combination thereof, which ultimately improves object tracking accuracy for use with an automated driving system. To solve these and other problems, the embodiments described herein provide, among other things, methods and systems for multi-hypothesis object tracking such that hypothesis formation is used in order to achieve robustness against errors in measurement models, data preprocessing, and the like. The embodiments described herein provide for a plurality of measurement models, preprocessing steps, or a combination thereof to be systematically used in parallel with various assumptions. The assumptions may be with regard to an object class, an object form, diversified methods for producing clusters from raw measurements, and the like.

For example, one embodiment provides an automated driving system. The system includes an electronic processor configured to receive environment information and generate pseudo-measurement data associated with an object within an environment of the vehicle. The electronic processor is also configured to determine, based on the environment information and the pseudo-measurement data, a set of association hypotheses regarding the object. The electronic processor is also configured to determine, based on the set of association hypotheses, an object state of the object. The electronic processor is also configured to control the vehicle based on the determined object state.

Another embodiment provides a method for multi-hypothesis object tracking. The method includes receiving environment information and generating, with an electronic processor, pseudo-measurement data. The method also includes generating, based on the environment information and the pseudo-measurement data, a set of association hypotheses for an object within an environment surrounding a vehicle. The method also includes determining, with the electronic processor, an object state for the object based on the set of association hypotheses. The method also includes controlling the vehicle based on the determined object state.

Yet another embodiment provides a non-transitory, computer-readable medium storing instructions that, when executed by an electronic processor, perform a set of functions. The set of functions includes receiving, from at least one sensor, environment information of a field of view. The set of functions also includes generating pseudo-measurement data. The set of functions also includes generating, based on the environment information and the pseudo-measurement data, a set of association hypotheses for an object within the field of view. The set of functions also includes determining an object state for the object based on the set of association hypotheses. The set of functions also includes determining a vehicle maneuver based on the determined object state. The set of functions also includes controlling a vehicle based on the vehicle maneuver.

Other aspects and embodiments will become apparent by consideration of the detailed description and accompanying drawings.

DETAILED DESCRIPTION

Figure 1A:
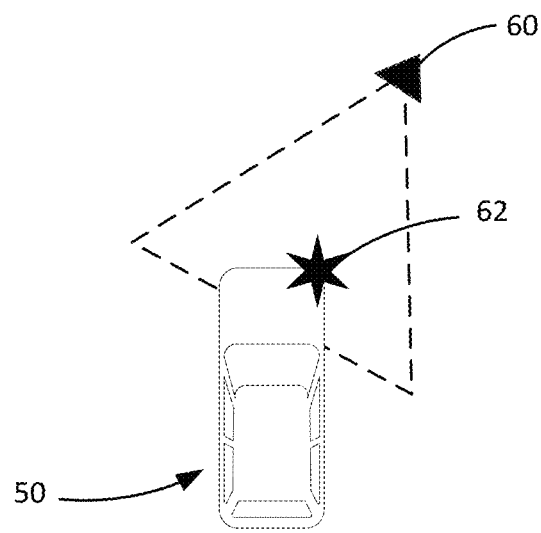
FIGS. 1A-1B illustrate example objects within an environment surrounding a vehicle.

Before any embodiments are explained in detail, it is to be understood the embodiments are not limited in their application to the details of construction and the arrangement of components set forth in the following description or illustrated in the following drawings. Other embodiments are possible and embodiments described and/or illustrated here are capable of being practiced or of being carried out in various ways. For example, although the examples described herein relate to automated driving systems, in other embodiments, the methods described herein may be applied to driving assistance systems, traffic monitoring systems, traffic control systems, security surveillance systems, and the like. It should also be understood that the term "vehicle" refers to various vehicles including, for example, passenger cars, trucks, boats, motorcycles, drones, and others.

It should also be noted that a plurality of hardware and software-based devices, as well as a plurality of different structural components may be used to implement embodiments disclosed herein. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects may be implemented in software (for example, stored on non-transitory computer-readable medium) executable by one or more processors. As such, it should be noted that a plurality of hardware and software-based devices, as well as a plurality of different structural components may be utilized to implement various embodiments. It should also be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

In driver assistance and in automated driving, objects in an environment surrounding a vehicle may be depicted in the form of an object list describing the objects. An object may be, in this case, formed through sensor data fusion, object tracking over time, or a combination thereof. On the basis of the object properties, a function determined by a processor of the vehicle determines whether there should be a reaction to the object and, if so, what the reaction should be. In automated driving, particularly in the field of sensor data fusion, it is desirable to have high requirements in terms of the object quality, avoiding false negatives, such that objects that actually exist are not accidentally missed/overlooked, and avoiding false positives, such as avoiding erroneous triggering due to incorrectly assumed objects that do not exist in reality.

As noted above, errors may be produced in object tracking through erroneous measurement models, errors in sensor data preprocessing, or a combination thereof. Erroneous classification of the object may lead to an erroneous measurement model. An error in a measurement model may cause an erroneous update, which in turn may result in an incorrect determined object state (for example, an object classification, a dynamic state, an object extension, or a combination thereof), track rupture, or a combination thereof.

Figure 1B:
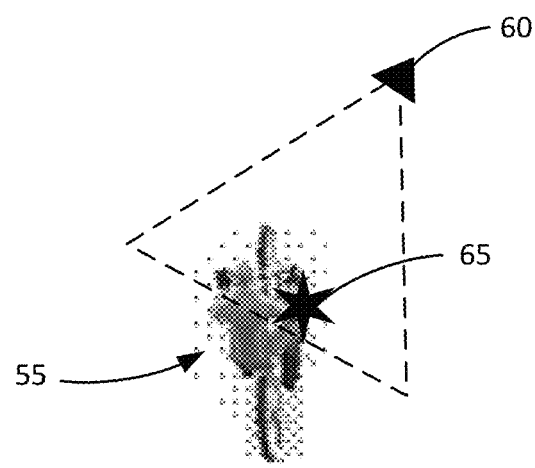

As one example, FIGS. 1A-1B illustrate the detection of a secondary vehicle 50 and a cyclist 55, respectively, using a radar sensor 60. As seen in FIG. 1A, a radar reflection (represented by the symbol associated with reference numeral 62) lies at a nearest edge or corner of the secondary vehicle 50 with respect to the radar sensor 60. In contrast, as seen in FIG. 1B, a main reflection (represented by the symbol associated with reference numeral 65) lies in the middle of the cyclist 55 (for example, the person sitting on the bicycle). Accordingly, an erroneous classification of an object (such as classifying the secondary vehicle 50 as the cyclist 55 or vice versa) may ultimately lead to the utilization of an erroneous measurement model.

Figure 2:
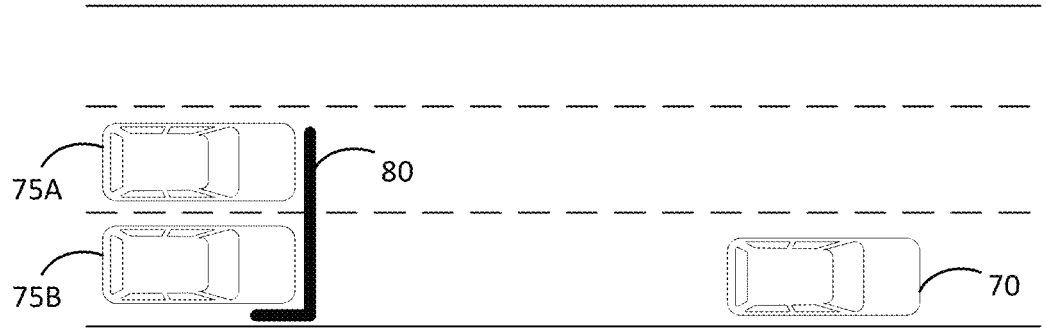
FIG. 2 illustrates an example environment surrounding a vehicle.

An error in the preprocessing of a measurement (for example, during clustering) may also result in similar undesirable results. As one example, FIG. 2 illustrates an example environment surrounding a vehicle 70 (equipped with an automated driving system). In the illustrated example, the environment surrounding the vehicle 70 includes a first object 75A and a second object 75B (both depicted as secondary vehicles). As seen in FIG. 2, the clustering of lidar stixels to form an "L" shape 80 may incorrectly resolve that only one object exists instead of the two that exist in reality (in this example, the first object 75A and the second object 75B). This may lead to a pseudo-measurement (described in greater detail below) resulting from the clustering in the sensor fusion processing not being associated so as to form one object, and the object is thereby not updated with the lidar data, which may lead to a track rupture, or to an update taking place with partly incorrect measurements, which may lead to an incorrect object state. As a result of such an error, an automated driving system may perform an incorrect vehicle maneuver or may not react to the object appropriately.

Measurement models and preprocessing steps for sensor data are increasingly being used with machine learning methods (for example, deep learning). These may be susceptible to errors in unpredictable situations. Such errors may have consequences in situations where a low false negative rate is required. This may lead to erroneous updating of an object and, thus, to a track rupture. As one example, an error may be caused by the object itself. For example, the object may be one that is not present in the training data of the deep learning/neural network, which may lead to false results. In the event of such an error, the assisted/automated driving system may no longer be able to react appropriately to an object, which may increase the risk of a collision.

To solve these and other problems, the embodiments described herein provide, among other things, methods and systems for multi-hypothesis object tracking such that hypothesis formation is used in order to achieve robustness against errors in measurement models, data preprocessing, and the like. The embodiments described herein provide for a plurality of measurement models, preprocessing steps, or a combination thereof to be systematically used in parallel with various assumptions, such as an object classification, an object form, diversified methods for producing clusters from raw measurements, and the like.

Figure 3:
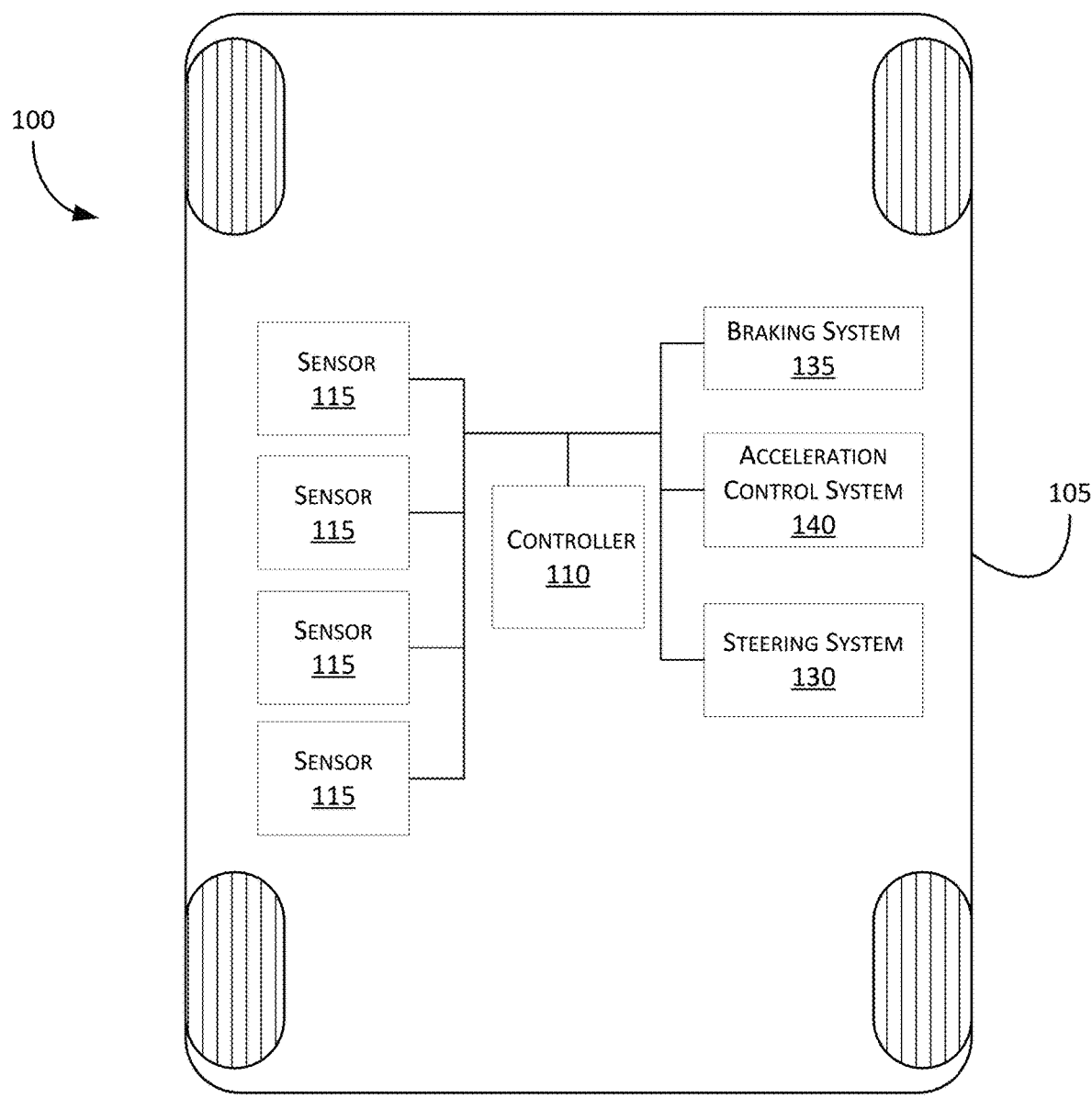
FIG. 3 schematically illustrates a vehicle equipped with a system for multi-hypothesis object tracking according to some embodiments.

FIG. 3 illustrates a system 100 for multi-hypothesis object tracking for an automated driving system of a vehicle 105. The vehicle 105, although illustrated as a four-wheeled vehicle, may encompass various types and designs of vehicles. For example, the vehicle 105 may be an automobile, a motorcycle, a truck, a bus, a semi-tractor, or another type of vehicle.

In the example illustrated, the system 100 includes a controller 110, a plurality of sensors 115 (referred to herein collectively as "the sensors 115" and individually as "the sensor 115"), a steering system 130, a braking system 135, and an acceleration control system 140. In some embodiments, the system 100 includes fewer, additional, or different components than those illustrated in FIG. 3 in various configurations and may perform functions in addition to the functionality described herein. As one example, in some embodiments, the system 100 includes a different number of sensors 115 than the four sensors 115 illustrated in FIG. 3, such as a single sensor 115.

Figure 4:
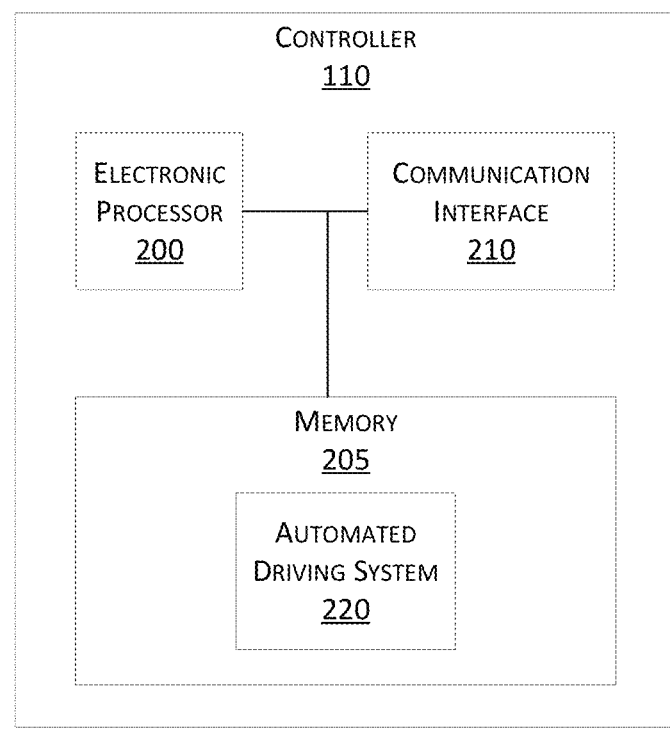
FIG. 4 schematically illustrates a controller of the system of FIG. 3 according to some embodiments.

As illustrated in FIG. 4, the controller 110 includes an electronic processor 200 (for example, a microprocessor, an application specific integrated circuit, or another suitable electronic device), a memory 205 (for example, one or more non-transitory computer-readable storage mediums), and a communication interface 210. The electronic processor 200, the memory 205, and the communication interface 210 communicate, over one or more data connections or buses, or a combination thereof. The controller 110 illustrated in FIG. 4 represents one example, and, in some embodiments, the controller 110 includes fewer, additional, or different components in different configurations than illustrated in FIG. 4. The controller 110 may be implemented in several independent controllers (for example, programmable electronic controllers) each configured to perform specific functions or sub-functions. Alternatively or in addition, the controller 110 may contain sub-modules that include additional electronic processors, memories, or application specific integrated circuits (ASICs) for handling input/output functions, processing of signals, and application of the methods listed below. Also, in some embodiments, the controller 110 performs functions in addition to the functionality described herein.

The electronic processor 200 is configured to access and execute computer-readable instructions ("software") stored in the memory 205. The software may include firmware, one or more applications, program data, filters, rules, one or more program modules, and other executable instructions. For example, the software may include instructions and associated data for performing a set of functions, including the methods described herein. For example, in some embodiments, the electronic processor 200 executes instructions for controlling the steering system 130, the braking system 135, the acceleration control system 140, or another vehicle system to perform an action (for example, a vehicle maneuver or vehicle behavior) pursuant to an automated driving system of the vehicle 105. For example, as illustrated in FIG. 4, the memory 205 may store an automated driving system 220. The automated driving system 220 controls the vehicle 105 (for example, the steering system 130, the braking system 135, the acceleration control system 140, another vehicle system, or a combination thereof) to perform a vehicle maneuver with limited or no input from the driver of the vehicle 105.

Returning to FIG. 4, the communication interface 210 allows the controller 110 to communicate with devices external to the controller 110 (for example, receive input from and provide output to). For example, as seen in FIG. 3, the controller 110 may be communicatively connected to one or more of the sensors 115, the steering system 130, the braking system 135, and the acceleration control system 140. In some embodiments, the communication interface 210 includes a port for receiving a wired connection with devices external to the controller 110. Accordingly, in some embodiments, the controller 110 is directly coupled via a dedicated wired connection to one or more components of the system 100. Alternatively or in addition, the communication interface 210 communicates with a communication bus (for example, a controller area network ("CAN")) to indirectly communicate with devices external to the controller 110. Accordingly, in other embodiments, the controller 110 is communicatively coupled to one or more of the components via a shared communication link, such as a vehicle communication network or bus (for example, a CAN bus, an Ethernet, or a FlexRay) or a wireless connection (via a transceiver). Each of the components of the system 100 may communicate with the controller 110 using various communication types and protocols.

The sensors 115 are configured to detect or collect measurements or data associated with an environment or surrounding of a vehicle 105 ("environment information"). A sensor 115 may include, for example, a radar sensor, a lidar sensor, an ultrasonic sensor, an image sensor (or camera), or the like. In some embodiments, the system 100 includes more than one type of sensor (for example, a radar sensor and an image sensor). The environment information may be associated with one or more objects within the environment surrounding the vehicle 105. An object may include, for example, a pedestrian, a bicyclist, another vehicle, or the like. Accordingly, the environment information may include, for example, a distance between the vehicle 105 and one or more objects in the environment surrounding the vehicle 105, a position of the vehicle 105 relative to the one or more objects in the environment surrounding the vehicle 105, or a combination thereof.

The sensors 115 may be located at different locations or positions throughout the vehicle 105 (for example, on the interior of the vehicle 105, the exterior of the vehicle 105, or a combination thereof). As one example, the sensors 115 may be externally mounted to a portion of the vehicle 105, such as on a side mirror, a front portion, a back portion, or one or more side portions of the vehicle 105. Alternatively or in addition, one or more of the sensors 115 may be external or remote from the vehicle, such as on infrastructure around the vehicle 105. As one example, the sensors 115 may be mounted on infrastructure around the vehicle 105 such that the sensors 115 may deliver the environment information to the automated driving system 220 (for example, transmitted by vehicle-to-infrastructure communication, delivered through backend servers, or the like). Accordingly, any sensor having a field of view that enables observing a detected object may be a provider of environment information.

Figure 5:
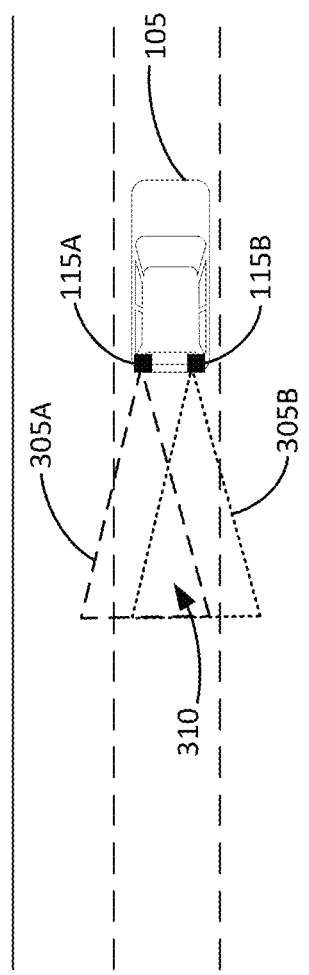
FIG. 5 schematically illustrates an example common field of view between two sensors according to some embodiments.

A sensor 115 is associated with a corresponding field of view of an area of the environment surrounding the vehicle 105. One or more operating parameters, such as a range of a field of view of a sensor 115, may be based on a configuration of the sensor 115. Accordingly, the sensors 115 may have field of views of different size (and depth). However, the sensors 115 may have field of views of similar (or the same) size (and depth). Accordingly, in some embodiments, the sensors 115 have field of views with the same range, different range, or a combination thereof. In some embodiments, a sensor 115 is positioned such that the sensor 115 has an overlapping field of view with at least one additional sensor 115. The overlapping area in which the field of views of each of the sensors 115 overlap with is referred to herein as "a common field of view." As one example, FIG. 5 illustrates the vehicle 105 with a first sensor 115A and a second sensor 115B. As seen in the illustrated example, the first sensor 115A has a first field of view 305A and the second sensor 115B has a second field of view 305B. FIG. 5 also illustrates a common field of view 310 between the first sensor 115A and the second sensor 115B.

Although the illustrated example, of FIG. 5 includes two sensors (the first sensor 115A and the second sensor 115B) having a common field of view (the common field of view 310), the system 100 may include one or more additional sensors (separate from but similar to the sensors 115 as described herein), where the one or more additional sensors share a common field of view (for example, a second common field of view). As one example, the system 100 may include the first sensor 115A, the second sensor 115B, and a third sensor. The third sensor may have a common field of view (for example, a second common field of view) with the second sensor 115B. In this example, the second sensor 115B has a first common field of view with the first sensor 115A and a second common field of view with the third sensor. As another example, the system 100 may include the first sensor 115A, the second sensor 115B, a third sensor, and a fourth sensor. In this example, the first sensor 115A and the second sensor 115 may have a first common field of view and the third sensor and the fourth sensor may have a second common field of view. Accordingly, the system 100 may include any number of sensors 115 with any number of common field of views shared among one or more of the sensors 115.

Although not illustrated, the other components of the system 100 may include similar components as the controller 110 (an electronic processor, a memory, and a communication interface). However, in some embodiments, the other components of the system 100 includes additional, fewer, or different components than the controller 110 in different configurations.

As noted above, the electronic processor 200 of the controller 110 executes instructions for multi-hypothesis object tracking for the system 100 in order to achieve robustness against errors in measurement models, data pre-processing, and the like. The electronic processor 200 executes instructions to perform the method 600 illustrated in FIG. 6 for multi-hypothesis object tracking for the automated driving system 220. The method 600 is described as being performed by the system 100 and, in particular, the automated driving system 220 as executed by the electronic processor 200. However, as noted above, the functionality (or a portion thereof) described with respect to the method 600 may be performed by other devices, such as another controller associated with the vehicle 105, or distributed among a plurality of devices, such as a plurality of controllers associated with the vehicle 105. As one example, in some embodiments, the functionality (or a portion thereof) described with respect to the method 600 may be performed by an external or remote device from the vehicle 105, such as, for example, where the vehicle 105 is controlled remotely.

Figure 6:
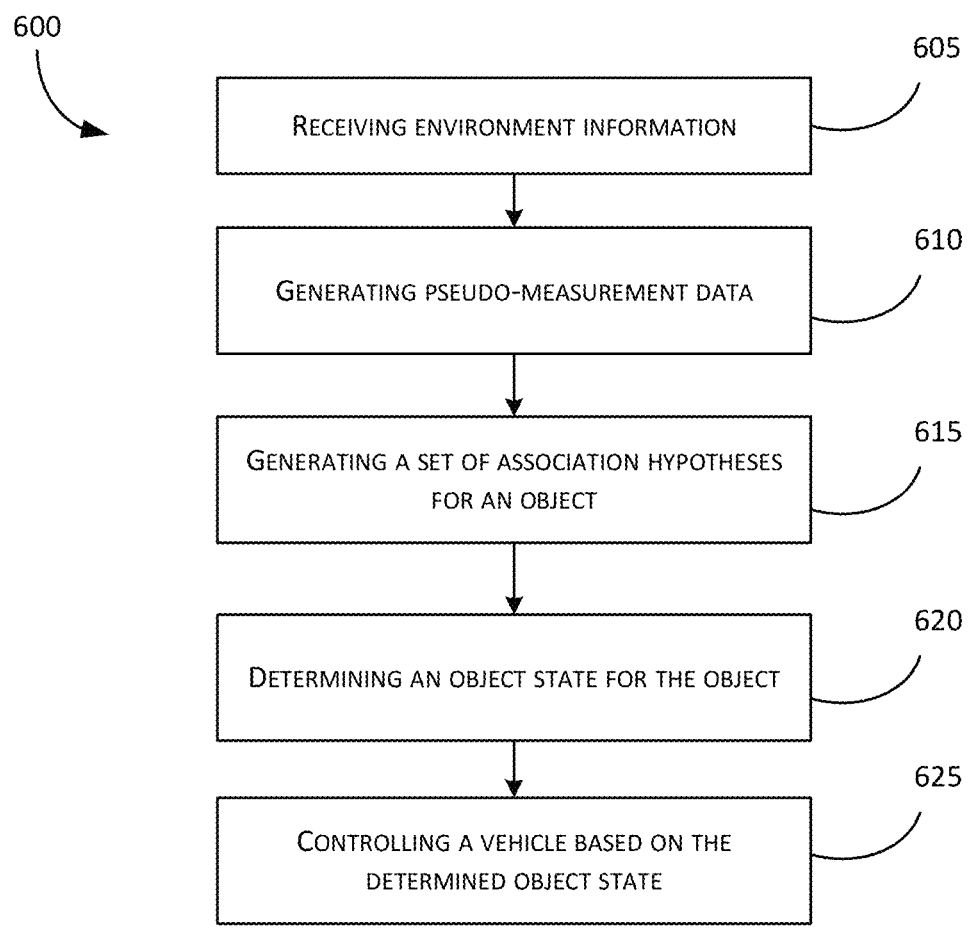
FIG. 6 is a flowchart illustrating a method for multi-hypothesis object tracking performed by the system of FIG. 3 in accordance with some embodiments.

As illustrated in FIG. 6, the method 600 includes receiving, with the electronic processor 200, environmental information (at block 605). As described above, environment information may include, for example, a distance between the vehicle 105 and one or more objects in the environment surrounding the vehicle 105, a position of the vehicle 105 relative to the one or more objects in the environment surrounding the vehicle 105, or a combination thereof. In some embodiments, the environment information includes one or more properties with respect to an object within an environment surrounding the vehicle 105. A property of an object may relate to, for example, a position of the object relative to the vehicle 105, a speed of the object, a direction of movement of the object, a distance between the vehicle 105 and the object, and the like.

The electronic processor 200 receives the environment information from one or more of the sensors 115 (via the communication interface 210). In some embodiments, the electronic processor 200 continuously receives the environment information (for example, in real time or near real time). However, in other embodiments, the electronic processor 200 cyclically or periodically receives the environment information (for example, ten or twenty times per second). In some embodiments, the environment information is associated with a common field of view. For example, as described above with respect to FIG. 5, in some embodiments, two or more of the sensors 115 share a common field of view (for example, a common field of view 310 as illustrated in the example of FIG. 5). Alternatively or in addition, in some embodiments, the sensors 115 include sensors of various types, such as radar sensors, image sensors, radar sensors, and the like. Accordingly, in some embodiments, the environment information received by the electronic processor 200 may be of varying media or mediums (for example, image-based, ultrasonic-based, and the like). As one example, the electronic processor 200 may receive a first set of environment information from a radar sensor (for example, as a first sensor 115) and a second set of environment information from a lidar sensor (for example, as a second sensor 115). According to this example, the first set of environment information is radar-based and the second set of environment information is lidar-based.

Figure 7:
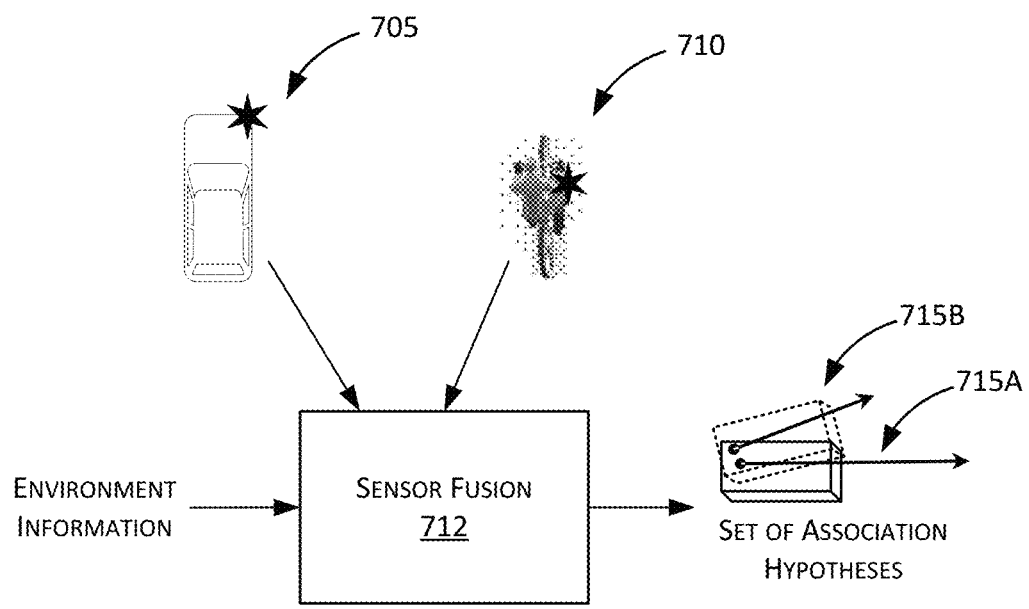
FIG. 7 is process model illustrating the determination of an object based on environmental information implemented by the system of FIG. 3 according to some embodiments.

The electronic processor 200 also generates pseudo-measurement data (at block 610). Pseudo-measurement data may include, for example, a pseudo-measurement, a measurement model hypothesis, or a combination thereof. A pseudo-measurement may be, for example, an abstraction of a set of raw sensor measurements (for example, a description of a cluster of measurements). Alternatively, the raw measurements may be used directly as pseudo-measurements. Alternatively or in addition, a pseudo-measurement may be generated as a confirmation of an estimation, an indication of an absence of actual environment information, or a combination thereof. As one example, the pseudo-measurement may indicate an absence of actual environment information (for example, negative information), which may confirm an estimated or known occlusion or deplausibilize an object if no occlusion explains the missing measurement. In some embodiments, a pseudo-measurement is associated with the object within the environment of the vehicle 105, such as for example, a three-dimensional bounding box that models a cluster of lidar points associated with the object. A measurement model hypothesis may be based on one or more assumptions, such as an assumed object classification or type (an "object classification assumption"). Alternatively or in addition, a measurement model hypothesis may be a generic hypothesis with no object classification assumption. Accordingly, in some embodiments, the electronic processor 200 generates pseudo-measurement data by generating one or more pseudo-measurements. Alternatively or in addition, in some embodiments, the electronic processor 200 generates pseudo-measurement data by generating one or more measurement model hypotheses, where each measurement model hypothesis is generated based on an object classification assumption, no object classification assumption, or a combination thereof. For example, as seen in FIG. 7, the electronic processor 200 may generate a first measurement model hypothesis 705 and a second measurement model hypothesis 710 (as pseudo-measurement data). In the illustrated example, the first measurement model hypothesis 705 hypothesizes that the object is a vehicle and the second measurement model hypothesis 710 hypothesizes that the object is a cyclist.

Accordingly, in some embodiments, the electronic processor 200 generates a set of pseudo-measurement data for each sensor measurement, such that, for each measurement, multiple alternative pseudo-measurement data hypotheses are generated using different modeling assumptions, clustering assumptions, or the like. In such embodiments, a different alternative version of pseudo-measurement data may be used for each sensor measurement.

In some embodiments, whether pseudo-measurements or measurement model hypotheses are generated (as pseudo-measurement data) is based on a type of sensor that the measurement model or pseudo-measurement is based on. For example, for a lidar sensor, the electronic processor 200 may generate a cluster of lidar points (for example, via a deep neural network), which models the cluster as a three-dimensional bounding box. The three-dimensional bounding box may then be used as a pseudo-measurement. Alternatively or in addition, the cluster of lidar points may be, for example, approximated by an L shape, a line segment, an ellipses, or the like. The parameters of the respective description may then be used as a pseudo-measurement. Alternatively or in addition, the electronic processor 200 may generate a pseudo-measurement based on the clustering of lidar stixels, where the clustering does not incorporate an object classification assumption. As another example, for a radar sensor, a reflection model (a measurement model) for radar may be dependent on the object type, which influences the measurement model used for the object update. Thus, the electronic processor 105 may generate a plurality of measurement model hypotheses with different assumptions (including hypotheses that are generic or not containing an object classification assumption).

In some embodiments, one or more of the hypotheses for the measurement model, the pseudo measurement data, or a combination thereof contain hypotheses that are generic, do not contain object classification assumptions, or a combination thereof. These generic models create robustness, for example, against incorrect classification information, classification assumptions, or a combination thereof. The purpose of the generic hypotheses is to become robust against incorrect assumptions by allowing for a reduced granularity of the model. These generic hypotheses may be considered as a fallback strategy for situations in which more elaborate measurement models or pseudo-measurement hypotheses are not applicable (for example, to cover rare object shapes or measurement situations). While the accuracy of the fallback strategy might not be sufficient to guarantee comfortable reactions of the vehicle, it may avoid object losses and, thus, dangerous situations.

As noted above, the pseudo-measurement data may include one or more pseudo-measurements, one or more measurement model hypotheses, or a combination thereof based on various one or more assumption. As a consequence, the decision as to which measurement model hypothesis/pseudo-measurement is ultimately used may be pushed further backward in the process chain when more information (from later measurements scans or from other sensors) is available. The implementation thereof in the sensor data fusion takes place, for example, by using a multi-hypothesis approach over a plurality of data scans using methods, such as a Labeled Multi-Bernoulli ("LMB") filter. In some embodiments, one or more hypotheses in which the alternative pseudo-measurements (for example, generated by various cluster hypotheses) are used simultaneously for the object update are excluded since, as a result of this, information from measurement data is used multiple times, even though independence of the measurements is assumed.

As seen in FIG. 6, the electronic processor 200 also generates a set of association hypotheses for an object within a field of view (at block 615). In some embodiments, the field of view is a common field of view associated with two or more sensors 115, as described in greater detail above. However, in other embodiments, the field of view is associated with a single sensor, such as in a single sensor system that obtains measurement data (environment information) over time from a single sensor 115. An association hypothesis generally refers to a hypothesis with respect to a possible object state of an object, such as an object within a common field of view of two or more sensors 115 or an object within a field of view of one sensor 115. In object tracking, when an automated driving system (such as the automated driving system 220) utilizes information from one or more sources (such as one or more of the sensors 115), utilizes one or more measurement models, or a combination thereof, the automated driving system 220 may determine more than one possible object state. Each possible object state is referred to herein as an association hypothesis.

Accordingly, in some embodiments, the electronic processor 200 determines one or more possible object states (as association hypotheses) for an object within an environment surrounding the vehicle 105 through sensor fusion (depicted in FIG. 7 as block 712) of the environment information. An object state may be based on one or more properties of the object. For example, an object state may be based on a position of the object relative to the vehicle 105, a speed of the object, a direction of movement of the object, an object classification for the object identifying what the object is (an object classification) (for example, whether the object is another vehicle, a motorcycle, a person, a bicycle, or the like), and the like. Accordingly, in some embodiments, determining an association hypothesis (or possible object state) includes determining one or more properties associated with the object. The fusion of sensor information (at block 712) involves one or more measurement models, motion models, object tracking processes, or a combination thereof (for example, the first measurement model hypothesis 705 and the second measurement model hypothesis 710 of FIG. 7).

Accordingly, in some embodiments, the set of association hypotheses are associated with an object within a common field of view associated with two or more of the sensors 115 or a field of view of a single sensor 115. The electronic processor 200 may generate the set of association hypotheses based on the environment information received from one or more of the sensors 115, the pseudo-measurement data, or a combination thereof. The set of association hypotheses may be associated with or correspond to the pseudo-measurement data. For example, the set of association hypotheses may include an association hypothesis for each pseudo-measurement, measurement model hypothesis, or a combination thereof. Returning to the example illustrated in FIG. 7, the electronic processor 200 may generate a first association hypothesis 715A and a second association hypothesis 715B (as a set of association hypotheses). The first association hypothesis 715B is associated with the second measurement model hypothesis 710 and the second association hypothesis 715A is associated with the first measurement model hypothesis 705. As one example, the environment information received from one or more of the sensors 115 may indicate a size, speed, and direction of movement of the object. Based on the environment information in this example, the electronic processor 200 may generate an association hypothesis that a possible object state for the object is a vehicle type, where the object is traveling at a faster speed than the vehicle 105 and in the same direction as the vehicle 105.

In some embodiments, over time (for example, each time cycle), the electronic processor 200 updates, merges, and/or prunes one or more association hypotheses as additional environmental information is received from one or more of the sensors 115. In such embodiments, the association hypotheses (and thus, the determined object state) are monitored and updated periodically (each period referred to as a cycle) based on new information, such as new environment information received from one or more of the sensors 115. In some embodiments, the electronic processor 200 utilizes and manages multiple association hypotheses over time using, for example, Multiple Hypotheses Tracking ("MHT") and Random Finite Set ("RFS") processes including Labeled Multi-Bernoulli ("LMB") filters.

After generating the set of association hypotheses (at block 615), the electronic processor 200 then determines an object state for the object (at block 620). As one example, the determined object state may include an object classification of a vehicle, where the object is traveling (a) in the left lane, (b) in the same direction as the vehicle 105, and (c) at a speed of 50 mph. The electronic processor 200 may determine the object state for the object based on the set of association hypotheses. Accordingly, in some embodiments, the determined object state is one of the association hypotheses included in the set of association hypotheses (i.e., one of the possible object states for the object). In some embodiments, the electronic processor 200 determines the object state for the object based on a probability associated with each association hypothesis included in the set of association hypotheses. For example, the electronic processor 200 may determine the object state for the object to be the association hypothesis (i.e., the possible object state) having the highest probability (for example, the association hypothesis most likely to be the correct object state of the object). Over time, and as more environment information is received from one or more of the sensors 115, the electronic processor 200 may combine or merge similar association hypotheses while association hypotheses that are determined to be unlikely possibilities are removed. Accordingly, the more hypotheses that are merged or combined, the higher a probability associated with the merged or combined association hypotheses. As another example, the probability for an association hypotheses may increase based on a number of remaining likely hypotheses. In other words, as more association hypotheses are removed as being unlikely, the higher the probability that the remaining association hypotheses are likely correct (or true).

Alternatively or in addition, in some embodiments, the electronic processor 200 forwards one or more of the association hypothesis with its respective probability to another component (for example, for consideration as to which possible object state is most likely the actual object state of the detected object). In some embodiments, a preliminary selection of one or more association hypotheses is performed prior to the sensor fusion (for example, block 712 of FIG. 7), for example, in order to limit computation time, to restrict the hypothesis growth, or a combination thereof.

As seen in FIG. 6, the electronic processor 200 may then control the vehicle 105 based on the determined object state for the object (at block 625). In some embodiments, the electronic processor 200 controls the vehicle 105 by determining whether to perform a vehicle maneuver based on the determined object state. Accordingly, in some embodiments, controlling the vehicle 105 based on the determined object state for the object includes not performing a vehicle maneuver or performing a vehicle maneuver. Alternatively or in addition, in some embodiments, the electronic processor 200 controls the vehicle 105 by determining what vehicle maneuver (or reaction) to perform based on the determined object state a performance timing of the vehicle maneuver (for example, when to perform the vehicle maneuver), and the like. The determination of the vehicular maneuver (based on the determined object state) may be performed using one or more automated driving techniques which, for sake of brevity, are not discussed in detail herein.

The electronic processor 200 may perform a vehicle maneuver by controlling the steering of the vehicle 105, affecting a speed of the vehicle 105 (for example, accelerating or braking the vehicle 105), or the like. In some embodiments, the electronic processor 200 performs the vehicle maneuver by generating and transmitting one or more control signals to one or more components of the vehicle 105, such as the steering system 130, the braking system 135, the acceleration control system 140, and the like. In response to receiving the control signals, the one or more components of the vehicle 105 may be controlled in accordance with its corresponding control signal.

Accordingly, the embodiments described herein may achieve robustness against errors in measurement models, data preprocessing, and the like by, for example, sorting out erroneous hypotheses based on subsequent measurements over time. For example, object tracking performance is improved by getting and removing (or pruning) hypotheses that contain erroneous track-to-measurement association (random errors) while keeping several other hypotheses over time. A method to keep the number of hypotheses feasible may include, for example, merging similar hypotheses while removing (or pruning) unlikely hypotheses.

In the field of extended object tracking, various hypotheses may also be formed through another technique—clustering sensor data. In these clustering techniques, the effect of errors in measurement data clustering are minimized because the hypothesis with the most consistent clustering (indicative that the hypothesis is true or correct) prevails over time. The motivation for these clustering techniques, however, is to improve the performance of object tracking by improving the association and clustering of measurement data, rather than the robustness of the system against incorrect assumptions in measurement models and data preprocessing. However, with respect to the embodiments described herein, particular hypotheses are determined to, for example, provide robustness against errors in measurement models and data preprocessing steps (for example, sensor data clustering, object classification, and the like) applied during fusion of the sensor data.

As noted above, although the examples described herein relate to automated driving systems, in other embodiments, the methods and systems described herein may be applied to other systems, such as, for example, driving assistance systems, traffic monitoring systems, traffic control systems, security surveillance systems, and the like. As one example, the sensors 115 may be mounted on infrastructure. According to this example, the sensors 115 may deliver the environment information to the automated driving system (for example, transmitted by vehicle-to-infrastructure communication, delivered through backend servers, or the like). Alternatively or in addition, the sensors 115 may collect environment information related to traffic monitoring and control. As one example, the sensors 115 may detect environment information related to where traffic is observed. According to this example, the electronic processor 200 may determine and control a traffic monitoring and control action, such as opening shared lanes, controlling traffic light timing, determining price for premium traffic, and the like. As another example, the sensors 115 may detect environment information for surveillance systems, such as for monitoring a location of a vehicle, a pedestrian, or the like on a premises. According to this example, the electronic processor 200 may determine and control a surveillance system action, such whether an alarm should be triggered based on a location of a vehicle or pedestrian. Accordingly, in some examples, the electronic processor 200 is not incorporated within or related to a specific vehicle, such as the vehicle 100. Rather, the electronic processor 200 may be, for example, part of a traffic monitoring system or surveillance system, whether locally (for example, on a local traffic monitoring system or surveillance system) or remotely (for example, a cloud-based application server or remote server).

Thus, the embodiments provide, among other things, methods and systems for multi-hypothesis object tracking for automated driving systems such that robustness against errors in measurement models, data preprocessing, and the like is achieved. Various features and advantages of certain embodiments are set forth in the following claims.

What is claimed is:

1. An automated driving system for a vehicle, the system comprising:
   an electronic processor configured to
      receive environment information,
      generate pseudo-measurement data associated with an object within an environment of the vehicle including generating a plurality of measurement model hypotheses for each measurement included in the environment information as the pseudo-measurement data, wherein each of the plurality of measurement model hypotheses is based on a different assumption and includes a first measurement model hypothesis based on a first assumption that the object is of a first object type and a second measurement model hypothesis based on a second assumption that the object is of a second object type,
      determine, based on the environment information and the pseudo-measurement data, a set of association hypotheses regarding the object,
      determine, based on the set of association hypotheses, an object state of the object, and
      control the vehicle based on the determined object state.

2. The system of claim 1, wherein at least one of the plurality of measurement model hypotheses is a generic measurement model hypothesis.

3. The system of claim 1, wherein the electronic processor is configured to update the set of association hypotheses in response to receiving new environment information.

4. The system of claim 1, wherein each association hypothesis included in the set of association hypotheses is associated with a possible object state of the object.

5. The system of claim 1, wherein the electronic processor is configured to receive the environment information from at least two sensors, the environment information associated with a common field of view of the at least two sensors.

6. The system of claim 5, wherein the pseudo-measurement data includes negative information associated with the common field of view.

7. The system of claim 1, wherein the electronic processor is configured to determine the object state of the object to be one of the association hypotheses included in the set of association hypotheses.

8. The system of claim 7, wherein the determination of the object state to be the one of the association hypotheses is based on the one of the association hypotheses having a higher probability than other association hypotheses included in the set of association hypotheses.

9. A method for multi-hypothesis object tracking, the method comprising:
   receiving environment information;
   generating, with an electronic processor, pseudo-measurement data by generating a first measurement model hypothesis based on a first assumption that the object is of a first object type and generating a second measurement model based on a second assumption that the object is of a second object type different from the first object type;
   generating, based on the environment information and the pseudo-measurement data, a set of association hypotheses for an object within an environment surrounding a vehicle;
   determining, with the electronic processor, an object state for the object based on the set of association hypotheses; and
   controlling the vehicle based on the determined object state.

10. The method of claim 9, further comprising:
    receiving new environment information; and
    updating the set of association hypotheses based on the new environment information.

11. The method of claim 10, wherein updating the set of association hypotheses includes removing at least one association hypothesis from the set of association hypotheses.

12. The method of claim 9, wherein receiving the environment information includes receiving environment information from at least two sensors, wherein the environment information is associated with a common field of view of the at least two sensors.

13. The method of claim 12, wherein generating the pseudo-measurement data includes generating negative information associated with the common field of view.

14. The method of claim 9, wherein generating the pseudo-measurement data includes generating a measurement model hypothesis.

15. The method of claim 9, wherein determining the object state includes determining the object state to be one of the association hypotheses included in the set of association hypotheses.

16. The method of claim 15, wherein determining the object state to be the one of the association hypotheses includes determining the one of the association hypotheses that has a higher probability than other association hypotheses included in the set of association hypotheses.

17. A non-transitory, computer-readable medium storing instructions that, when executed by an electronic processor, perform a set of functions, the set of functions comprising:
    receiving, from at least one sensor, environment information of a field of view, the field of view including an object;
    generating pseudo-measurement data by generating a first measurement model hypothesis based on a first assumption that the object is of a first object type and generating a second measurement model based on a second assumption that the object is of a second object type different from the first object type;

generating, based on the environment information and the pseudo-measurement data, a set of association hypotheses for the object within the field of view;
determining an object state for the object based on the set of association hypotheses;
determining a vehicle maneuver based on the determined object state, and
controlling a vehicle based on the vehicle maneuver.

* * * * *